(12) United States Patent
Nishimura

(10) Patent No.: US 8,857,556 B2
(45) Date of Patent: Oct. 14, 2014

(54) ARRANGEMENT STRUCTURE OF CANISTER IN MOTORCYCLE

(75) Inventor: Shin Nishimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 119 days.

(21) Appl. No.: 13/428,704

(22) Filed: Mar. 23, 2012

(65) Prior Publication Data

US 2012/0247862 A1 Oct. 4, 2012

(30) Foreign Application Priority Data

Mar. 29, 2011 (JP) ................................. 2011-071410

(51) Int. Cl.
*B60K 15/00* (2006.01)
*B62K 19/46* (2006.01)
*F02M 25/08* (2006.01)
*B62K 11/04* (2006.01)

(52) U.S. Cl.
CPC ............ *F02M 25/0854* (2013.01); *B62K 19/46* (2013.01); *B62K 11/04* (2013.01); *F02M 25/089* (2013.01)
USPC .......................................... 180/291; 180/219

(58) Field of Classification Search
USPC ......... 180/291, 292, 296, 299, 312, 219, 230, 180/231
See application file for complete search history.

(56) References Cited

U.S. PATENT DOCUMENTS

| 5,261,504 A * | 11/1993 | Katsura .......................... 180/219 |
| 6,397,823 B1 * | 6/2002 | Mammarella .................. 123/516 |
| 6,425,451 B2 * | 7/2002 | Yoshida et al. ............... 180/219 |
| 7,377,552 B2 * | 5/2008 | Miyabe .......................... 280/835 |
| 7,617,901 B2 * | 11/2009 | Takahashi et al. ............. 180/219 |
| 2010/0065362 A1 * | 3/2010 | Shimura et al. ............... 180/219 |
| 2010/0071985 A1 * | 3/2010 | Harada .......................... 180/219 |
| 2010/0078241 A1 * | 4/2010 | Maeda et al. ................. 180/68.3 |

FOREIGN PATENT DOCUMENTS

JP 60-145265 U 9/1985

* cited by examiner

*Primary Examiner* — Frank Vanaman
(74) *Attorney, Agent, or Firm* — Birch, Stewart, Kolasch & Birch, LLP

(57) ABSTRACT

In an arrangement structure of a canister disposed near a cylinder of an internal combustion engine of a motorcycle, the motorcycle including a left and right pair of frames, extending rearwardly from a head pipe, for suspending the internal combustion engine laterally, to enable protection of the canister without involving an increase in the number of parts of a protective member. The canister is disposed between the frames and the internal combustion engine so as to overlap at least partly with the pair of frames in a side view.

19 Claims, 9 Drawing Sheets

ARRANGEMENT STRUCTURE OF CANISTER IN MOTORCYCLE

CROSS-REFERENCE TO RELATED APPLICATIONS

The present application claims priority under 35 USC 119 to Japanese Patent Application No. 2011-071410 filed Mar. 29, 2011 the entire contents of which are hereby incorporated by reference.

BACKGROUND OF THE INVENTION

1. Field of the Invention

The present invention relates to an arrangement structure of a canister in a motorcycle.

2. Description of Background Art

A known technique disposes a canister between V-banks in a V-type engine in which cylinders are disposed at the front and the rear. See, for example, Japanese Patent Laid-open No. Sho 60-145265. As such, in V-type engines, the canister may be disposed in an empty space using the cylinder, thereby protecting the canister from the front and rear. Unfortunately, this technique does not protect both lateral sides of the canister. If side surfaces are to be protected with strength equivalent to that at the front and rear, therefore, protection is necessary through the use of a protective part (such as a protector) having a certain level of rigidity. This leads to an unfavorable problem by increasing the number of parts used.

According to an embodiment of the present invention, an arrangement structure of a canister disposed near a cylinder of an internal combustion engine of a motorcycle is provided to enable the protection of the canister without involving an increase in the number of parts of a protective member.

According to an embodiment of the present invention, the motorcycle (1) includes a left and right pair of frames (4), extending rearwardly from a head pipe (2), for suspending an internal combustion engine (11) laterally with the canister (26) being disposed around a cylinder (24) of the internal combustion engine (11). The canister (26) is disposed between the frames (4) and the internal combustion engine (11) so as to overlap at least partly with the pair of frames (4) in a side view.

According to an embodiment of the present invention, the canister (26) is supported by a wide support stay (45) disposed across the pair of frames (4).

According to an embodiment of the present invention, the support stay (45) includes a plurality of arm portions (46, 47) for mounting on the frames 4, the arm portions (46, 47) extending laterally and disposed at a front and a rear of the stay (45), for supporting auxiliaries other than the canister (26).

According to an embodiment of the present invention, the support stay (45) is mounted on the frames (4) at mounting portions (48, 49) via elastic cushioning members (57).

According to an embodiment of the present invention, the canister (26) is supported by the support stay (45) at upper and lower portions thereof.

According to an embodiment of the present invention, the canister (26) is supported by a holding portion (45B) of the support stay (45) at upper and lower portions thereof via a cylindrical elastic member (36).

According to an embodiment of the present invention, the canister (26) has a fitting groove (35) disposed on an outer periphery thereof, into which the cylindrical elastic member (36) for use in the elastic support is to be fitted. The fitting groove (35) has an inclined surface (37) formed at an edge of an inlet side of the fitting groove (35).

According to an embodiment of the present invention, a luggage compartment (17) is disposed upwardly of the canister (26) with a battery (21) as an auxiliary supported by the support stay (45) being disposed between a storage case (20) inside the luggage compartment (17) and the support stay (45).

According to an embodiment of the present invention, an intake system (66) connected to the internal combustion engine (11) is disposed forwardly of the canister (26) with the canister (26) being disposed in an area surrounded by the intake system (66), the cylinder (24), and a crankcase (14).

According to an embodiment of the present invention, the canister (26) can be protected by rigid members, being covered in the cylinder (24) at a front surface thereof and in the frames (4) at lateral sides thereof. In addition, an engine (13) and the frames (4) are used as protective members, which prevents an increase in the number of parts used.

According to an embodiment of the present invention, the canister (26) is supported by the wide support stay (45), so that the canister (26) can be steadily held in position.

According to an embodiment of the present invention, other auxiliaries in addition to the canister 26 can be supported, which achieves a reduced number of parts used.

According to an embodiment of the present invention, the support stay (45) is to be mounted on the vehicle body frame (3), the support stay (45) is mounted at the mounting portions (48, 49) of the vehicle body frame (3) via the elastic cushioning members (57). This prevents the support stay (45) or the canister (26) from resonating with vehicle vibrations.

According to an embodiment of the present invention, the canister (26) is held by upper and lower arms (55, 56) of a holding portion (45B) of the support stay (45). This enhances support stiffness of the canister (26).

According to an embodiment of the present invention, the canister (26) is held by the upper and lower arms (55, 56) of the support stay (45) via the cylindrical elastic member (36). The canister (26) can thereby be cushioned and reliably held in place.

According to an embodiment of the present invention, the canister (26) has the fitting groove (35) disposed on the outer periphery thereof, into which the cylindrical elastic member (36) for use in elastic support is to be fitted and the fitting groove (35) has the inclined surface (37) formed at an edge of the inlet side of the fitting groove (35). This allows the cylindrical elastic member (36) to be easily fitted into the fitting groove (35).

According to an embodiment of the present invention, a heavy battery (21) can be disposed in a dead space available between the canister (26) and the storage case (20) in the luggage compartment (17).

According to an embodiment of the present invention, the canister (26) can be disposed by effectively and actively using a dead space available around the internal combustion engine (11).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
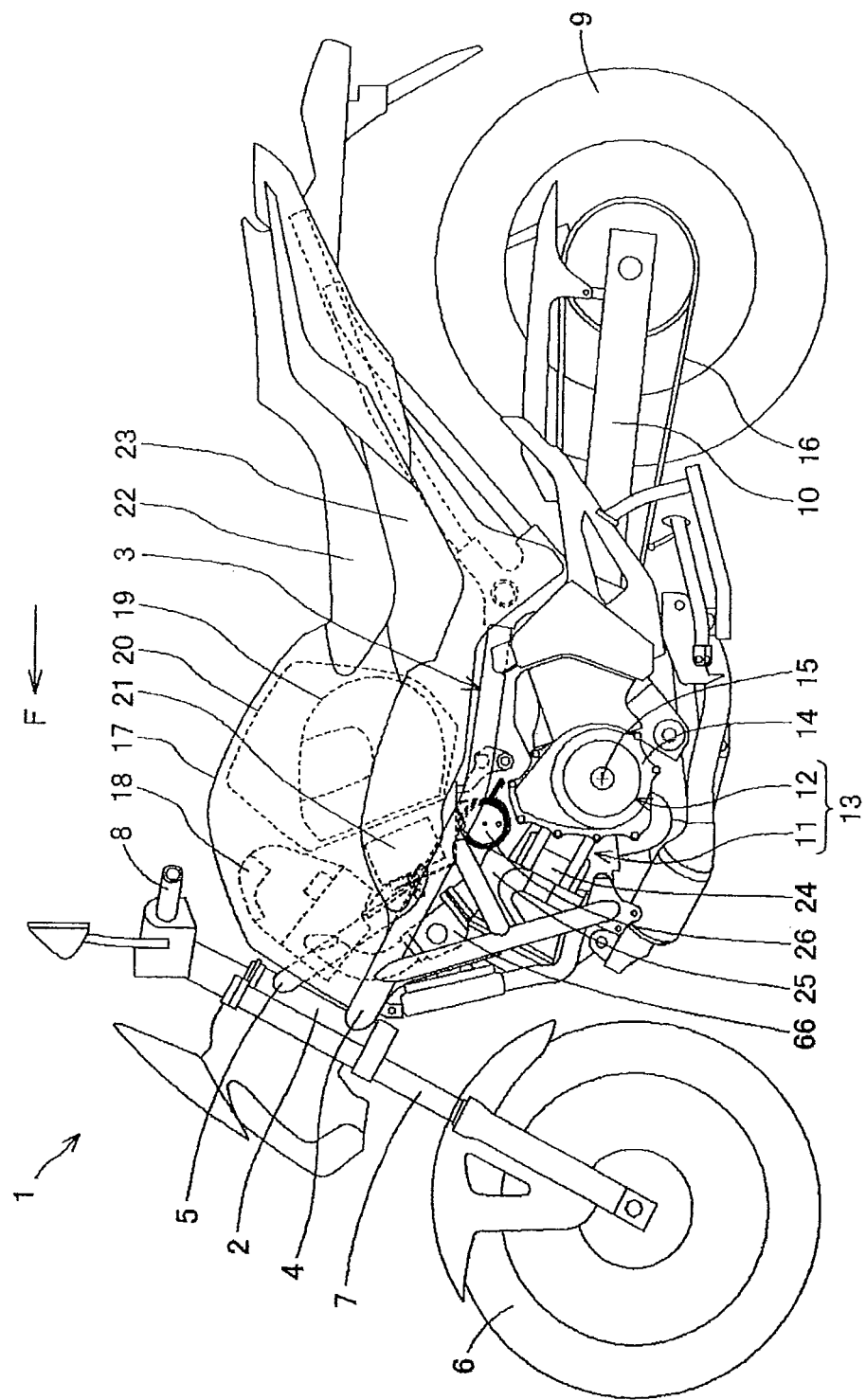
FIG. 1 is a left side elevational view showing a motorcycle according to an embodiment of the present invention.

FIG. 1 is a left side elevational view showing a motorcycle 1 according to an embodiment of the present invention. In the accompanying drawings, arrows F, L, and R denote forward, leftward, and rightward directions, respectively. Referring to FIG. 1, the motorcycle 1 includes a head pipe 2 and a vehicle body frame 3. More specifically, the head pipe 2 is disposed at a vehicle front end portion. The vehicle body frame 3 includes a pair of main frames 4 that extend obliquely downwardly apart from the head pipe 2 toward the left and right rear sides and a reinforcing frame 5. A front fork 7 for supporting a front wheel 6 is steerably supported on the head pipe 2. A steering handlebar 8 is connected to an upper portion of the front fork 7. A rear fork 10 for supporting a rear wheel 9 is vertically swingably supported on the vehicle body frame 3 via suspension means. An engine 13 that integrates an internal combustion engine 11 with a transmission 12 is suspended on the vehicle body frame 3. The engine 13 includes a crankcase 14 in which a crankshaft 15 and a transmission shaft are housed. Power of the engine 13 is transmitted to the rear wheel 9 via a chain transmission mechanism 16. An air cleaner 18 is accommodated in a luggage compartment 17 at an upper portion of the vehicle body frame 3. A storage case 20 for storing, for example, a helmet 19 is disposed rearwardly of the air cleaner 18. A battery 21 is disposed downwardly of the air cleaner 18 and the storage case 20. A seat 22 is disposed rearwardly of the storage case 20. A fuel tank 23 is disposed downwardly of the seat 22. A cylinder 24 is connected to the crankcase 14. A cylinder head 25 is connected to an upper portion of the cylinder 24. An intake system 66 that constitutes an intake passage connecting between the cylinder head 25 and the air cleaner 18 is disposed on the cylinder 24.

The motorcycle 1 includes an evaporative system (evaporative emission control system). The evaporative emission control system works as follows. More specifically, fuel vapors generated in the fuel tank 23 are temporarily absorbed and stored in activated carbon of a canister 26; fresh air is introduced into the canister 26 by intake vacuum in the intake passage of the internal combustion engine 11 to thereby desorb the fuel vapors from the activated carbon; the desorbed fuel vapors are drawn together with a mixture by the intake system 66 to thereby serve for combustion in the internal combustion engine 11, so that the system prevents the fuel vapors from diffusing.

Referring to FIG. 1, the canister 26 is disposed between the main frames 4 and the cylinder 24 of the internal combustion engine 11 so as to overlap at least partly with the main frames 4 in a side view. The battery 21 is disposed slightly forwardly, and upwardly, of the canister 26.

Figure 2A:
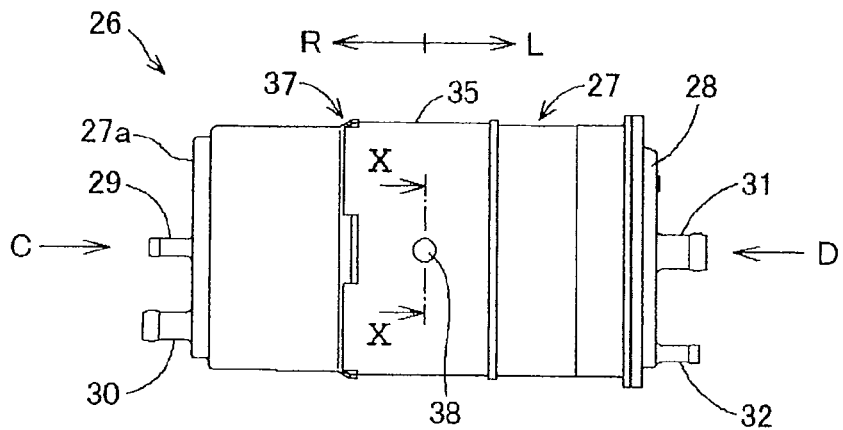
FIG. 2(a) is a front elevational view showing a canister.
Figure 2B:
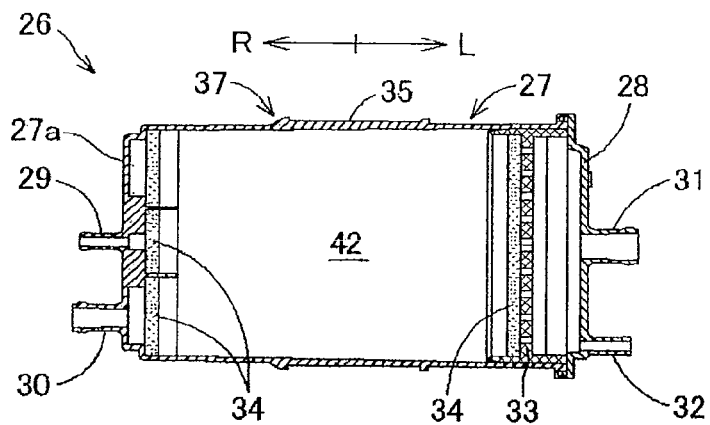
FIG. 2(b) is a cross-sectional view of the canister.
Figure 2C:
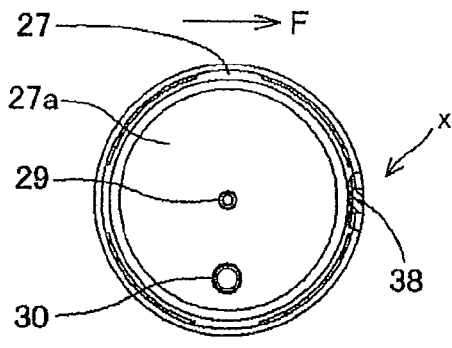
FIG. 2(c) is a view taken on arrow C in FIG. 2(a) and FIG. 2(d) is a view taken on arrow D in FIG. 2(a)
Figure 2D:
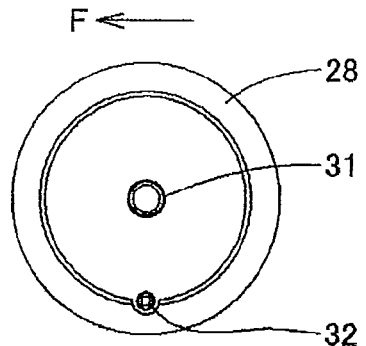

FIGS. 2(a) to 2(d) are a set of views showing the canister 26. FIG. 2(a) is a front elevational view showing the canister 26. FIG. 2(b) is a cross-sectional view showing the canister 26. FIG. 2(c) is a view on arrow C of FIG. 2(a). FIG. 2(d) is a view on arrow D of FIG. 2(a). Though the cross-sectional view of FIG. 2(b) shows only an outer shell of the canister 26, activated carbon powders are packed in the outer shell during use. In FIG. 2(b), the outer shell includes a case 27 and a cap 28 disposed on the left end of the case 27.

A fuel vapor discharge hose connection portion 29 that joins to the fuel tank 23 and a purge hose connection portion 30 that joins to the intake system 66 of the internal combustion engine 11 are disposed on a right end surface 27a of the case 27. Referring to FIG. 2(b), a fresh air introducing hose connection portion 31 and a drain hose connection portion 32 are disposed on the cap 28 at the left end of the case 27. Referring to FIG. 2(b), a grid 33 is disposed near the left end in the case 27. A filter 34 is disposed on the inside of each of the grid 33, the fuel vapor discharge hose connection portion 29, and the purge hose connection portion 30. The activated carbon powders (not shown) are packed in a wide canister internal space 42 sandwiched between these filters 34 from both sides.

Referring to FIGS. 2(a) and 2(b), the case 27 has a wide fitting groove 35 formed on an outer periphery at a central portion thereof. A cylindrical elastic member 36 to be described is fitted into this fitting groove 35. An inclined surface 37 is formed at each of edges at an inlet side of the fitting groove 35 at four places. The inclined surface 37 facilitates fitting of the cylindrical elastic member 36.

FIG. 2(c) is a cross section representing a view on arrow X-X of FIG. 2(a). The part indicated by an arrow x is a small protrusion 38 formed on a front outer surface of the canister 26 and used for positioning the cylindrical elastic member 36.

Figure 3A:
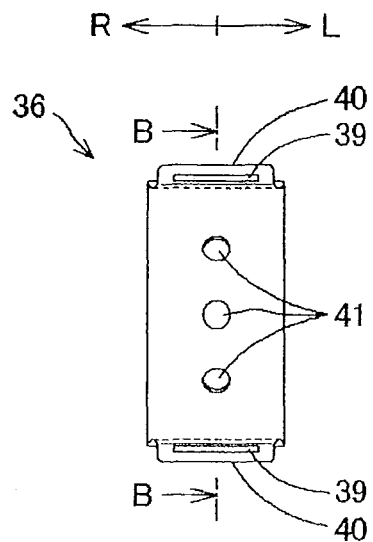
FIG. 3(a) is a front elevational view showing a cylindrical elastic member.
Figure 3B:
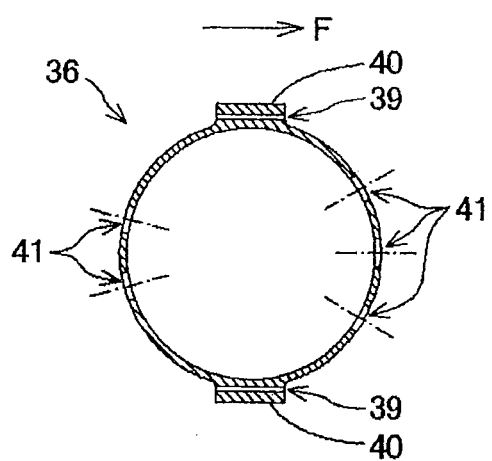
FIG. 3(b) is a cross-sectional view taken along line B-B in FIG. 3(a)

FIGS. 3(a) and 3(b) are a set of views showing the cylindrical elastic member 36. FIG. 3(a) is a front elevational view and FIG. 3(b) is a cross-sectional view taken along line B-B of FIG. 3(a). The cylindrical elastic member 36 is formed of synthetic rubber and includes lock portions 40 disposed at upper and lower portions thereof. The lock portion 40 has a wide through hole 39 formed therein. In addition, the cylindrical elastic member 36 has circular through holes 41 formed in a peripheral surface thereof, three in a front surface and two in a rear surface thereof. These circular through holes 41 are intended for positioning the cylindrical elastic member 36 relative to the canister case 27. In this embodiment, of the three circular through holes 41 in the front surface, only the center circular through hole 41 is required. A plurality of circular through holes 41 are provided in order to allow the cylindrical elastic member 36 and the canister 26 to be carried over to other models. Any one of the multiple circular through holes 41 is selected as appropriately according to a specific disposition applicable in the model concerned.

The cylindrical elastic member 36 is fitted over the canister case 27 from the right end side and the protrusion 38 on the front surface of the case 27 is fitted into the center circular through hole 41 in the front surface of the cylindrical elastic member 36. This correctly positions the cylindrical elastic member 36. At this time, the lock portions 40 having the wide through holes 39 are disposed at upper and lower positions of the canister case 27.

Figure 4:
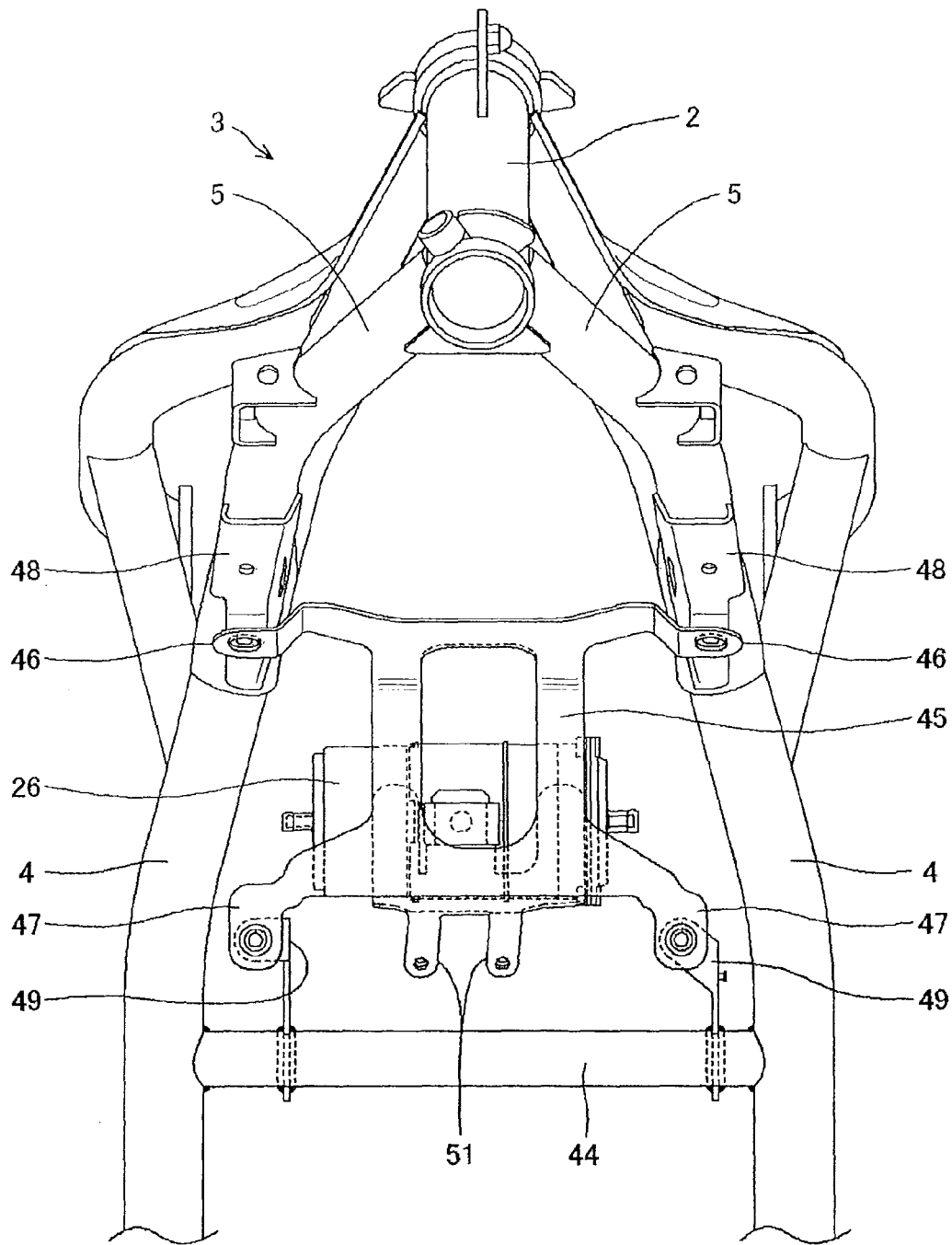
FIG. 4 is a plan view showing a structure for supporting the canister.

FIG. 4 is a plan view showing a structure for supporting the canister 26. The vehicle body frame 3 includes the left and right pair of main frames 4 joined to the head pipe 2 and extending rearwardly therefrom, the reinforcing frame 5 connecting between the head pipe 2 and the main frame 4, and a bridge member 44 for bridging between the right and left main frames 4. The canister 26 is supported by a support stay 45 having a rectangular shape. The rectangular support stay 45 includes a front side arm portion 46 extending laterally and a rear side arm portion 47 extending laterally. The front side arm portion 46 of the support stay 45 is fixed with bolts and nuts 50 (FIG. 8) to mounting portions 48 welded to the reinforcing frame 5. The rear side arm portion 47 of the support stay 45 is fixed with the bolts and nuts 50 (FIG. 8) to mounting portions 49 welded to the bridge member 44. The canister 26 is held at a lower portion of the support stay 45. Purge valve mounting arms 51 having threaded holes extend from a rear portion of the support stay 45.

Figure 5:
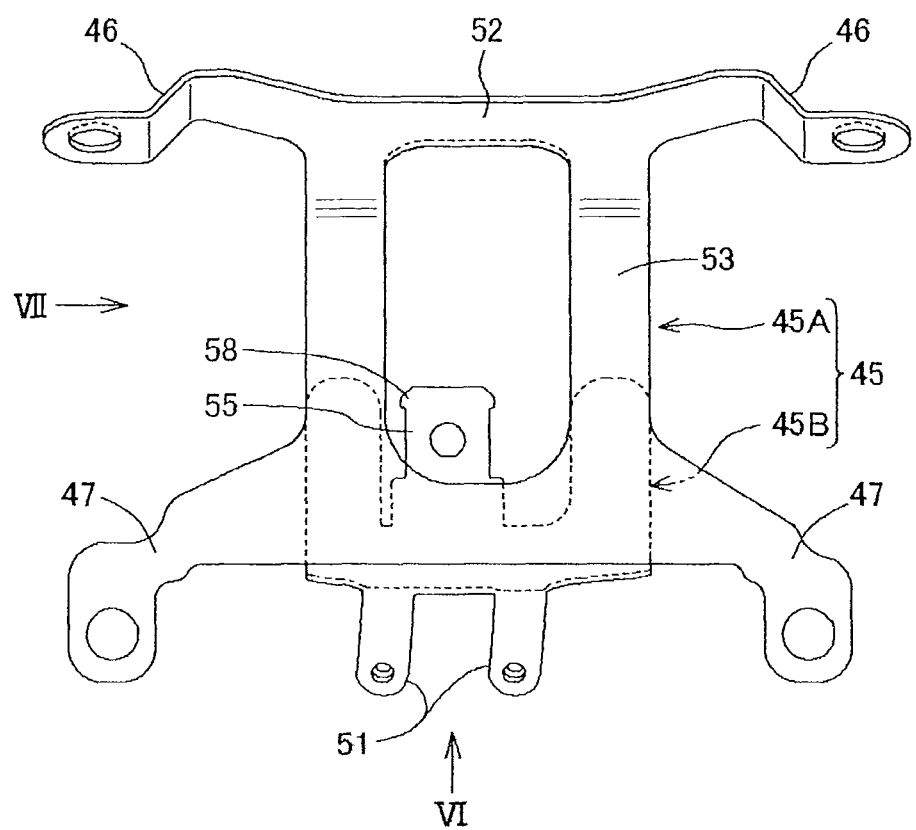
FIG. 5 is a plan view showing a support stay.
Figure 6:
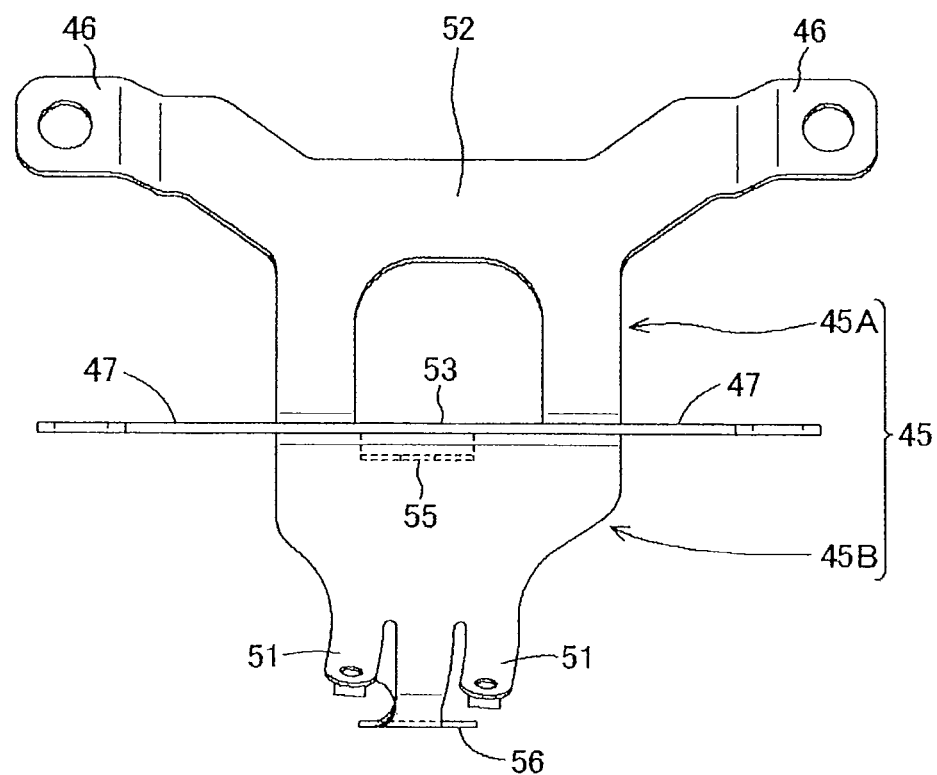
FIG. 6 is a view on arrow VI of FIG. 5.
Figure 7:
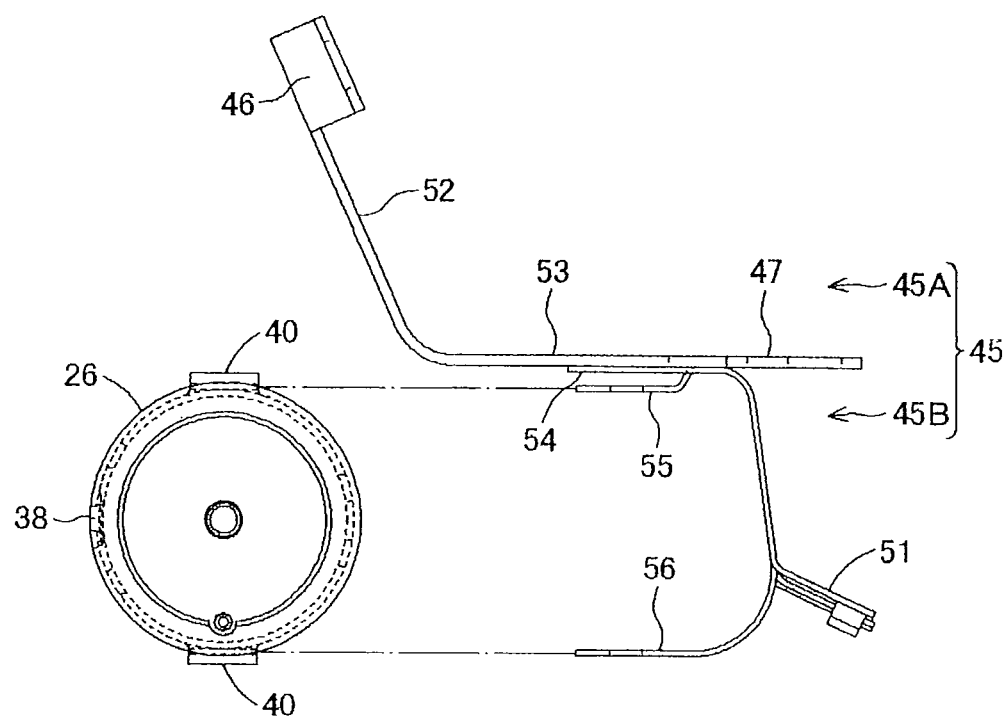
FIG. 7 is a view on arrow VII of FIG. 5.

FIG. 5 is a plan view showing the support stay 45. FIG. 6 is a view on arrow VI of FIG. 5. FIG. 7 is a view on arrow VII of FIG. 5. FIG. 7 also includes a side elevational view of the canister 26. The support stay 45 includes a supporting portion 45A and a holding portion 45B disposed downwardly of the supporting portion 45A. Referring to FIG. 7, the supporting portion 45A includes an inclined portion 52 including the front side arm portion 46 and a horizontal portion 53 joined to a rear portion of the inclined portion 52 and including the rear side arm portion 47. The holding portion 45B is manufactured separately from the supporting portion 45A and attached to the supporting portion 45A through spot welding. In FIG. 7, the holding portion 45B includes a spot-welded portion 54, an upper portion arm 55 extending forwardly from a point near the spot-welded portion 54, a lower portion arm 56 curved and extending downwardly from the spot-welded portion 54 and further extending forwardly, and the pair of purge valve mounting arms 51 branching rearwardly from the lower portion arm 56. In FIG. 5, each of the upper portion arm 55 and the lower portion arm 56 has a leading end wide portion 58.

Figure 8:
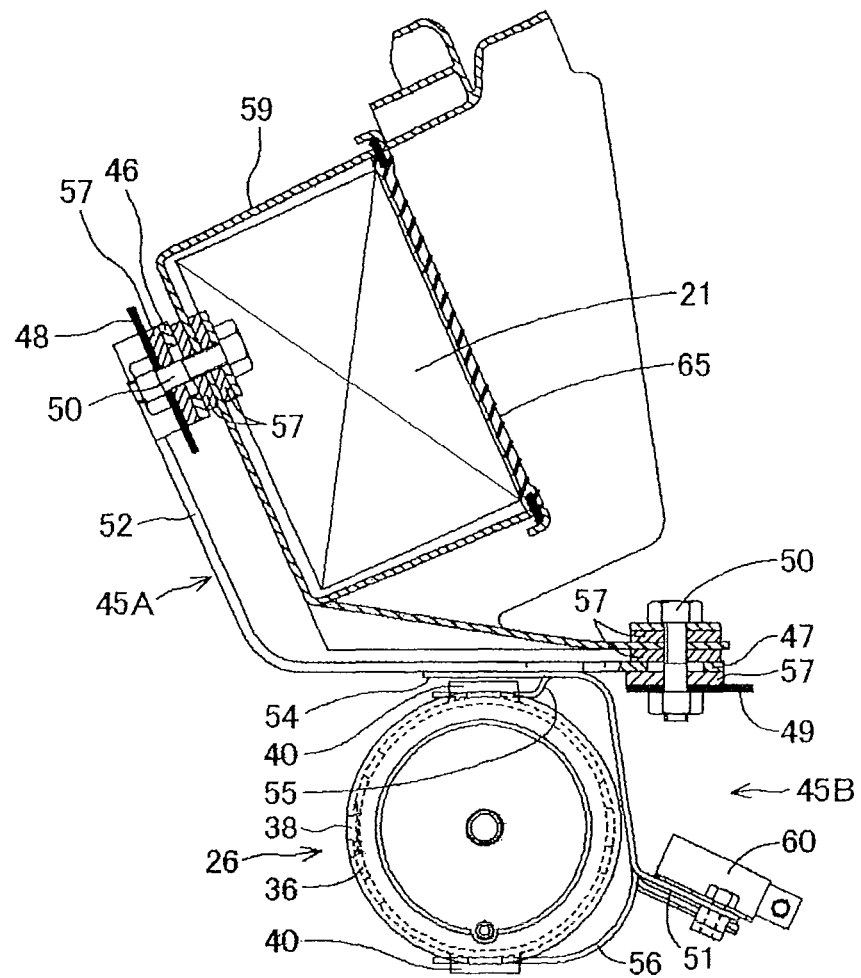
FIG. 8 is a side elevational view showing a condition in which the support stay and associated parts are mounted.

FIG. 8 is a side elevational view showing a condition in which the support stay 45 and associated parts are mounted. FIG. 8 shows that a battery case 59 storing the battery 21 is held by the inclined portion 52 of the supporting portion 45A of the support stay 45 and the canister 26 is mounted on the holding portion 45B of the support stay 45. The front side arm portion 46 and the rear side arm portion 47 of the support stay 45 are mounted, together with the battery case 59, on the mounting portions 48 and 49 of the vehicle body frame 3 with the bolts and the nuts 50 via elastic cushioning members 57. The battery 21 is housed in the battery case 59 and prevented from falling with a wide rubber band 65.

When the canister 26 is to be held by the holding portion 45B, the upper portion arm 55 and the lower portion arm 56 of the holding portion 45B are inserted in the wide through holes 39 in the upper lock portion 40 and the lower lock portion 40 of the cylindrical elastic member 36. Each of the upper portion arm 55 and the lower portion arm 56 has the leading end wide portion 58 (FIG. 5). After the upper portion arm 55 and the lower portion arm 56 are inserted in the wide through holes 39 (FIG. 3), the leading end wide portions 58 protrude from end portions of the wide through holes 39, so that the upper portion arm 55 and the lower portion arm 56 are not removed from the wide through holes 39. A purge valve 60 is mounted on the purge valve mounting arms 51 of the holding portion 45B of the support stay 45.

Figure 9:
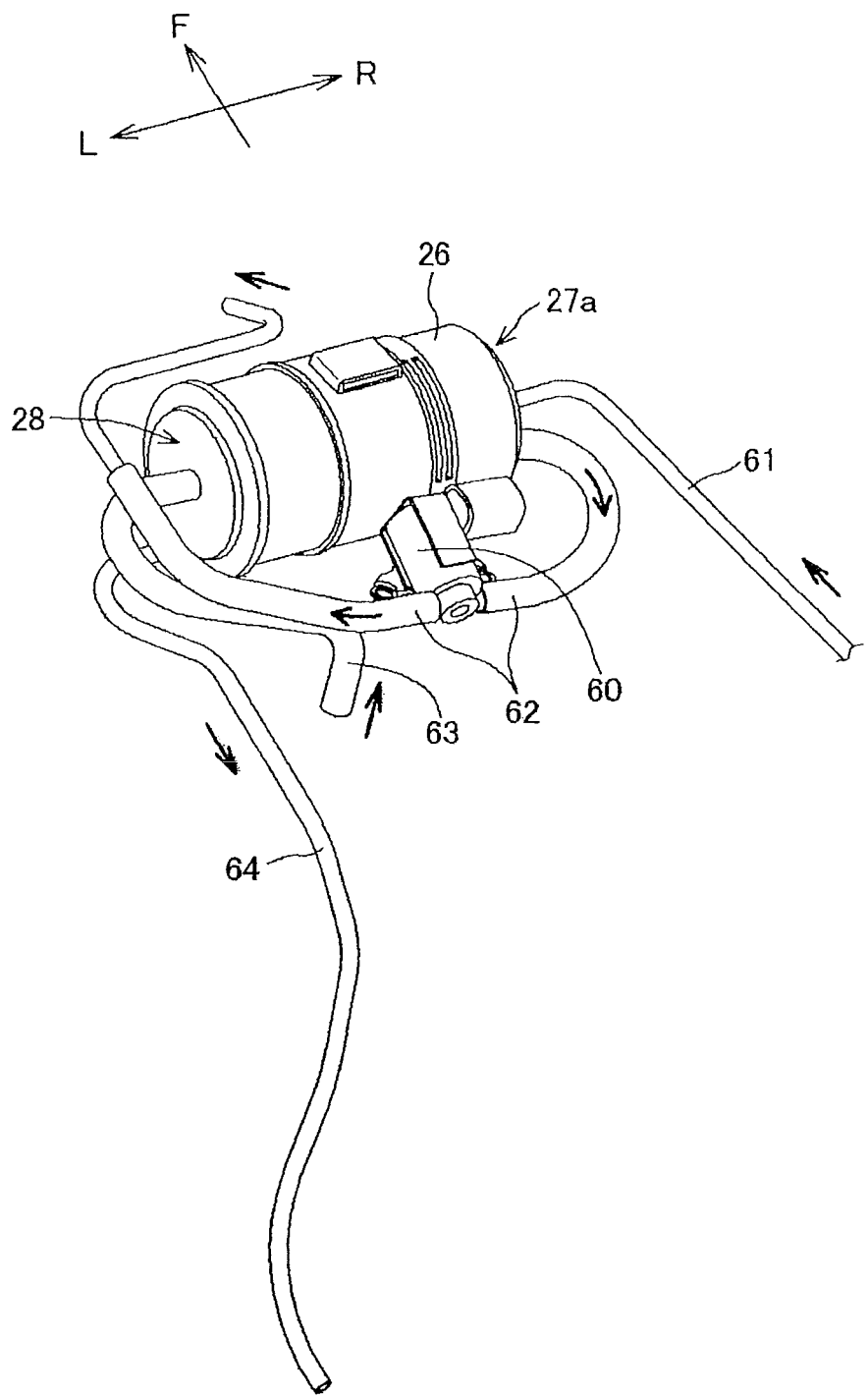
FIG. 9 is a perspective view showing the canister and hoses connected thereto.

FIG. 9 is a perspective view showing the canister 26 and hoses connected thereto. The purge valve 60 is disposed rearwardly of the canister 26. The purge valve 60 is mounted on the purge valve mounting arms 51 with a bolt as shown in FIG. 8. A fuel vapor discharge hose 61 is connected to the right end surface 27a of the case 27. The fuel vapor discharge hose 61 is joined to a gas-liquid separator built into the fuel tank 23 (FIG. 1) and connected to a connection portion disposed on the fuel tank 23, so that fuel vaporized in the fuel tank 23 is fed into the canister 26. A purge hose 62 extends from the right end surface 27a of the case 27 and, by way of the purge valve 60, is joined to the intake system 66 of the internal combustion engine 11. A fresh air introducing hose 63 is connected to the cap 28 that closes the left end of the case 27. A drain hose 64 is connected to the cap 28 and extends downwardly. Connection portions of these hose in the canister 26 are shown in FIG. 2.

The operation of the evaporative system will be described below with reference to FIG. 9.

Fuel vapors that have flowed through the fuel vapor discharge hose 61 into the canister 26 are temporarily adsorbed by the activated carbon. When the intake vacuum of the intake system 66 acts on the canister 26, the fuel vapors are desorbed from the activated carbon by fresh air introduced into the canister 26 via the fresh air introducing hose 63 and are drawn into the intake passage via the purge valve 60 and the purge hose 62.

The purge valve 60 connected to the purge hose 62 is a one-way valve that limits an amount of fuel vapors drawn in to thereby prevent an air-fuel ratio of a mixture from being varied greatly due to a large amount of fuel vapors drawn in the intake system 66 at one time. The purge valve 60 permits a flow of the fuel vapors from the canister 26 to the intake system 66 only when a vacuum of a predetermined value or more acts, and blocks flow of gas from the intake system 66 back to the canister 26. The drain hose 64 joined to the cap 28 of the canister 26 has a lower end open to the atmosphere, so that moisture produced in the canister 26 or, for example, a small amount of fuel that flows in directly from the fuel vapor discharge hose 61 and cannot be processed can be discharged.

The above-described embodiment can achieve the following effects.

(1) The canister 26 is disposed between the pair of main frames 4 and the internal combustion engine 11 so as to overlap partly with the pair of main frames 4 in a side view of the vehicle. The canister 26 can be protected by the cylinder 24 covering the front surface of the canister 26 and the main frames 4 covering sides of the canister 26. Not only that, but the engine 13 and the main frames 4 are used as protective members. This eliminates the need for any dedicated protective members, which prevents the number of parts used from increasing.

(2) The canister 26 is supported by the wide support stay 45 disposed across the pair of main frames 4, so that the canister 26 is steadily held in position.

(3) The support stay 45 includes the arm portions 46 and 47 for mounting on the vehicle body frame 3 at four places, the arm portions 46 and 47 extending laterally and disposed at a front and a rear of the support stay 45. This arrangement allows auxiliaries other than the canister 26 to be also supported. This eliminates the need for any dedicated supporting members for those auxiliaries, achieving a reduced number of parts used.

(4) When the support stay 45 is to be mounted on the vehicle body frame 3, the support stay 45 is mounted at the mounting portions 48 and 49 of the vehicle body frame 3 via the elastic cushioning members 57. This prevents the support stay 45 or the canister 26 from resonating with vehicle vibrations.

(5) The canister 26 is held by the upper portion and lower portion arms 55 and 56 of the holding portion 45B of the support stay 45. This enhances support stiffness of the canister 26.

(6) The canister 26 is held by the upper portion and lower portion arms 55 and 56 of the support stay 45 via the cylindrical elastic member 36. The canister 26 can thereby be cushioned and reliably held in place.

(7) The canister 26 has the fitting groove 35 disposed on the outer periphery thereof, into which the cylindrical elastic member 36 for use in elastic support is to be fitted and the fitting groove 35 has the inclined surface 37 formed at an edge of the inlet side of the fitting groove 35. This allows the cylindrical elastic member 36 to be easily fitted into the fitting groove 35.

(8) The luggage compartment 17 is disposed upwardly of the canister 26 and the battery 21 as an auxiliary supported by the support stay 45 is disposed between the storage case 20 inside the luggage compartment 17 and the support stay 45. This allows a dead space available between the canister 26 and the storage case 20 to be used for disposing the heavy battery 21.

(9) The intake system 66 connected to the internal combustion engine 11 is disposed forwardly of the canister 26 and the canister 26 is disposed in an area surrounded by the intake system 66, the cylinder 24, and the crankcase 14. The canister 26 can therefore be disposed by effectively and actively using the dead space available around the internal combustion engine 11. In addition, the purge hose 62 extending from the canister 26 to the intake system 66 can be shortened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arrangement structure of a canister in a motorcycle including a left and right pair of frames, extending rearwardly from a head pipe, for suspending an internal combustion engine laterally, the canister being disposed around a cylinder of the internal combustion engine, comprising:
    a cylindrical elastic member mounted on said canister said cylindrical elastic member includes a locking portion; and
    a support stay with a supporting portion and a holding portion, said holding portion engaging said locking portion on said cylindrical elastic member for supporting the canister relative to the support stay;
    said canister being disposed between the frames and the internal combustion engine to overlap at least partly with the pair of frames in a side view,
    wherein said locking portion includes:
    an upper locking portion with an upper aperture formed in the upper locking portion, and
    a lower locking portion with a lower aperture formed in the lower locking portions, and
    said holding portion includes an upper arm received within said upper aperture and a lower arm received within said lower aperture for supporting the canister relative to the support stay.

2. The arrangement structure of the canister in the motorcycle according to claim 1, wherein the support stay is a wide support stay disposed across the pair of frames for supporting the canister.

3. The arrangement structure of the canister in the motorcycle according to claim 2, wherein:
    the support stay includes a plurality of arm portions for mounting on the frames, the arm portions extending laterally and being disposed at a front and a rear of the support stay, for supporting auxiliaries other than the canister.

4. The arrangement structure of the canister in the motorcycle according to claim 2, wherein the support stay is mounted on the frames at mounting portions via elastic cushioning members.

5. The arrangement structure of the canister in the motorcycle according to claim 2, wherein:
    an intake system connected to the internal combustion engine is disposed forwardly of the canister; and
    the canister is disposed in an area surrounded by the intake system, the cylinder, and a crankcase.

6. The arrangement structure of the canister in the motorcycle according to claim 1, wherein:
    said support stay includes a plurality of arm portions for mounting on the frames, the arm portions extending laterally and being disposed at a front and a rear of the support stay, for supporting auxiliaries other than the canister.

7. The arrangement structure of the canister in the motorcycle according to claim 6, wherein the support stay is mounted on the frames at mounting portions via elastic cushioning members.

8. The arrangement structure of the canister in the motorcycle according to claim 6, wherein:
    a luggage compartment is disposed upwardly of the canister; and
    a battery as an auxiliary supported by the support stay is disposed between a storage case inside the luggage compartment and the support stay.

9. The arrangement structure for the canister according to claim 6, and further including a purge valve, said purge valve being mounted on purge valve mounting arms of the holding portion of the support stay.

10. The arrangement structure of the canister in the motorcycle according to claim 1, wherein said support stay is mounted on the frames at mounting portions via elastic cushioning members.

11. The arrangement structure of the canister in the motorcycle according to claim 10, wherein:
    a luggage compartment is disposed upwardly of the canister; and
    a battery as an auxiliary supported by the support stay is disposed between a storage case inside the luggage compartment and the support stay.

12. The arrangement structure of the canister in the motorcycle according to claim 1, wherein:
    the canister is supported by said holding portion of the support stay at upper and lower portions thereof via said cylindrical elastic member.

13. The arrangement structure of the canister in the motorcycle according to claim 1, wherein:
    an intake system connected to the internal combustion engine is disposed forwardly of the canister; and
    the canister is disposed in an area surrounded by the intake system, the cylinder, and a crankcase.

14. The arrangement structure for the canister according to claim 1, wherein the upper and lower apertures are wide holes extending through the upper and lower locking portions.

15. An arrangement structure of a canister in the motorcycle including a left and right air of frames, extending rearwardly from a head pipe, for suspending an internal combustion engine laterally, the canister being disposed around a cylinder of the internal combustion engine, comprising:
a cylindrical elastic member mounted on said canister said cylindrical elastic member includes a locking portion; and
a support stay with a supporting portion and a holding portion, said holding portion engaging said locking portion on said cylindrical elastic member for supporting the canister relative to the support stay;
said canister being disposed between the frames and the internal combustion engine to overlap at least partly with the pair of frames in a side view,
wherein the canister is supported by said holding portion of the support stay at upper and lower portions thereof via said cylindrical elastic member, and
the canister has a fitting groove disposed on an outer periphery thereof, into which the cylindrical elastic member for use in elastic support is to be fitted; and
the fitting groove has an inclined surface formed at an edge of an inlet side of the fitting groove.

16. An arrangement structure for a canister comprising:
a left and right pair of frames, extending rearwardly from a head pipe, for suspending an internal combustion engine laterally;
front side arm portions extending laterally between the left and right pair of frames;
rear side arm portions extending laterally between the left and right pair of frames;
said front and rear side arm portions securing said canister adjacent to the internal combustion engine;
a cylindrical elastic member mounted on said canister, said cylindrical elastic member includes a locking portion; and
a support stay with a supporting portion and a holding portion, said holding portion engaging said locking portion on said cylindrical elastic member for supporting said canister relative to the support stay;
said canister being disposed between the frames and the internal combustion engine to overlap at least partly with the pair of frames in a side view,
wherein said locking portion includes:
an upper locking portion with an upper aperture formed in the upper locking portion, and
a lower locking portion with a lower aperture formed in the lower locking portions, and
said holding portion includes an upper arm received within said upper aperture and a lower arm received within said lower aperture for supporting the canister relative to the support stay.

17. The arrangement structure for the canister according to claim 16, wherein the support stay is a wide support stay disposed across the pair of frames for supporting the canister.

18. The arrangement structure for the canister according to claim 16, wherein the support stay is mounted on the frames at mounting portions via elastic cushioning members.

19. The arrangement structure for the canister according to claim 16, wherein the upper and lower apertures are wide holes extending through the upper and lower locking portions.

* * * * *